United States Patent [19]
Allison

[11] Patent Number: 4,505,445
[45] Date of Patent: Mar. 19, 1985

[54] APPARATUS FOR DE-ICING THE LEADING EDGE OF AN AIRFOIL SECTION OF AN AIRCRAFT

[75] Inventor: Robert A. Allison, Hueytown, Ala.

[73] Assignee: Idea Development Corporation, Birmingham, Ala.

[21] Appl. No.: 466,372

[22] Filed: Feb. 15, 1983

[51] Int. Cl.³ .............................................. B64D 15/02
[52] U.S. Cl. ............................. 244/134 B; 244/134 R
[58] Field of Search ........... 244/134 R, 134 B, 134 C, 244/134 A

[56] References Cited

U.S. PATENT DOCUMENTS

| | | | |
|---|---|---|---|
| 267,138 | 5/1843 | Neumann | 244/134 B |
| 1,836,432 | 12/1931 | Barlow | 244/134 B |
| 2,160,397 | 5/1939 | Brammer | 244/134 B |
| 2,304,686 | 12/1942 | Gregg | 244/134 B |
| 2,336,194 | 12/1943 | Shuhi | 244/134 B |

FOREIGN PATENT DOCUMENTS 505433  5/1939  United Kingdom ............ 244/134 B

Primary Examiner—Trygve M. Blix
Assistant Examiner—Rodney Corl
Attorney, Agent, or Firm—Woodford R. Thompson, Jr.

[57] ABSTRACT

Method and apparatus for de-icing the leading edges of airfoil sections of aircraft embodies a closed circuit conduit having a heat conductive section extending along the leading edge of each airfoil section. The rear side of each heat conductive section is secured to and insulated from its leading edge while the leading side of each heat conductive section defines an exposed, heat emitting surface. A heated liquid is circulated through the closed circuit conduit at a temperature and flow rate to cause heat to be emitted from the heat emitting surface to dislodge ice accumulated thereon as the liquid is cooled.

1 Claim, 4 Drawing Figures

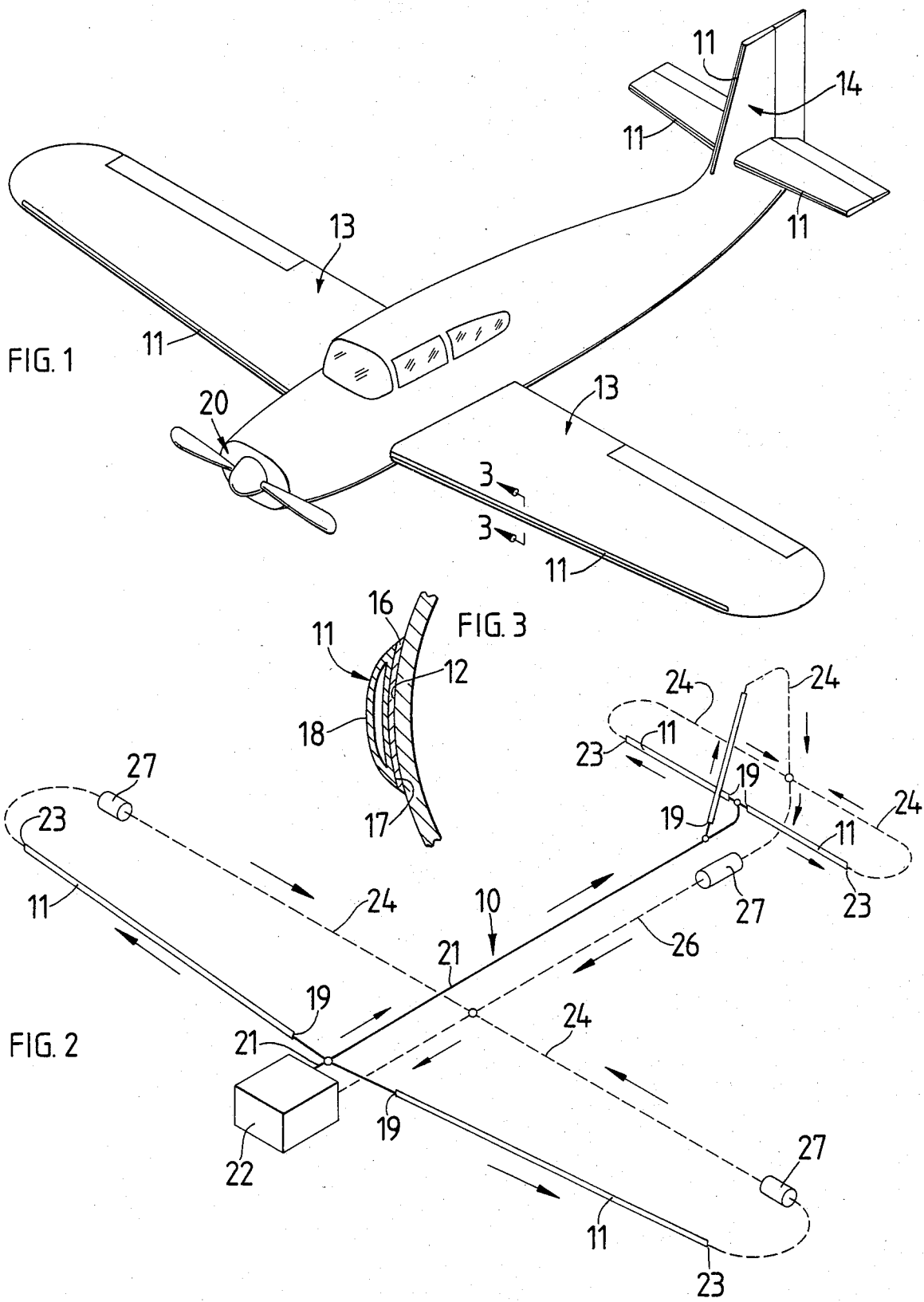

APPARATUS FOR DE-ICING THE LEADING EDGE OF AN AIRFOIL SECTION OF AN AIRCRAFT

BACKGROUND OF THE INVENTION

This invention relates to a method and apparatus for de-icing the leading edge of an airfoil section of an aircraft and more particularly to an improved method and apparatus which circulates a heated liquid through a conduit extending along the leading edge of the airfoil section of the aircraft to cause de-icing of such leading edge.

As is well known, during certain weather conditions, considerable difficulties have been encountered with the accumulation of ice on airfoil sections of aircraft. In most instances, the ice is formed along the leading edges of the airfoil sections by freezing rain, snow, sleet and other forms of precipitation which occur while flying through saturated air. The ice is retained on the leading edges of the airfoil sections by the forces of the air which pass over and under the airfoil sections and by the adhesive tension between the ice and the material used to form the airfoil sections. The forces of the air passing over and under the airfoil sections constantly dislodge and remove ice which is built up on the thicker mid portions and on the trailing edges of the airfoil sections. Accordingly, as ice builds up along the leading edges of the airfoil sections, the shapes of the wings and tail section may be changed so that they will no longer be able to produce the differential pressures required to sustain the weight of the aircraft in flight.

Many attempts have been made to avoid the accumulation and build up of ice along the leading edges of airfoil sections of aircraft. Among such attempts include the installation of expandible de-icer boots on the leading edges of airfoil sections which crack and dislodge the ice when inflated. Also, porous de-icing fluid distributors have been employed along the leading edges of the airfoil sections to distribute de-icing fluid which melts the ice deposited thereon. U.S. Pat. No. 2,371,269 discloses an aircraft ice preventer which utilizes the hot exhaust gases of the engine propelling the aircraft to melt the ice on the leading edges of the airfoil sections. Heating tubes are disposed within the leading edges of the wings and tail airfoil sections with one end of each tube being connected to the engine exhaust system. Hot gases flow through the heating tubes to heat the leading edges of the airfoil sections and then are discharged to the atmosphere. Difficulties have been encountered with this type de-icer system due to the fact that the exhaust gases are not dense enough to carry and conduct heat along the full length of the airfoil sections of the aircraft. That is, heat from the exhaust gases is rapidly conducted to the portions of the leading edges of the wing and tail sections which are closest to the engine exhaust system while the remaining areas of the leading edges of the airfoil sections receive little or no heat to bring about removal of the ice accumulated thereon. This is especially true since the forces of the air rushing over the discharge valves at the wing tip areas create a negative pressure which causes the cooled exhaust gases to be rapidly discharged through the exhaust valves into the atmosphere before they can conduct heat to the ice accumulated on the leading edges.

SUMMARY OF THE INVENTION

In accordance with my invention, I overcome the above and other difficulties by providing an improved method and apparatus for de-icing the leading edge of an airfoil section of an aircraft.

The principal object of my invention is to provide a deicer having improved means for circulating a heated liquid at a predetermined temperature and flow rate through a closed circuit conduit extending along the leading edge of an airfoil section to conduct heat from the heated liquid along the entire length of the leading edge to thus dislodge ice accumulated thereon.

Another object of my invention, as illustrated in its preferred form, is to provide means for circulating heated oil from the engine or engines propelling the aircraft to the leading edges of the airfoil sections to thus dislodge ice accumulated thereon and at the same time aid in cooling the engine oil.

Another object of my invention is to provide an improved de-icer which does not add excessive weight to the aircraft and will not disturb the equilibrium of the aircraft while in flight.

Still another object of my invention is to provide apparatus which is simple and durable of construction, economical of manufacture, and one which can be quickly and easily installed on airfoil sections of new or existing aircraft with only slight modifications to the airfoil sections.

My improved apparatus and method for de-icing the leading edges of airfoil sections of aircraft comprises a closed circuit conduit having a heat conductive section extending along the leading edge of each airfoil section. The rear side of each heat conductive section is secured to and insulated from the adjacent leading edge of an airfoil section while the leading side of each heat conductive section defines an exposed, heat emitting surface. A heated liquid, such as heated oil from the aircraft engine or engines, is circulated through the conduit at a temperature and flow rate which causes heat to be emitted from the heat emitting surfaces to thus dislodge ice accumulated thereon as the liquid is cooled.

DESCRIPTION OF THE DRAWINGS

Apparatus embodying features of my invention and which may be employed to carry out my improved method for de-icing the leading edges of airfoil sections of aircraft is illustrated in the accompanying drawings, forming a part of this application, in which:

FIG. 1 is a perspective view of an aircraft showing the heat conductive sections of my closed circuit conduit extending along the leading edges of the wings and tail sections of the aircraft;

FIG. 2 is a diagrammatic view showing the closed circuit conduit communicating with the oil circulating system of the power unit which propels the aircraft;

FIG. 3 is an enlarged, fragmental sectional view taken generally along the line 3—3 of FIG. 1; and, FIG. 4 is a perspective view showing a multi-engine aircraft having my improved apparatus associated therewith with the heat conductive sections thereof being shown in dot-dash lines and the return conduits being shown in dashed lines.

DETAILED DESCRIPTION

Figure 4:
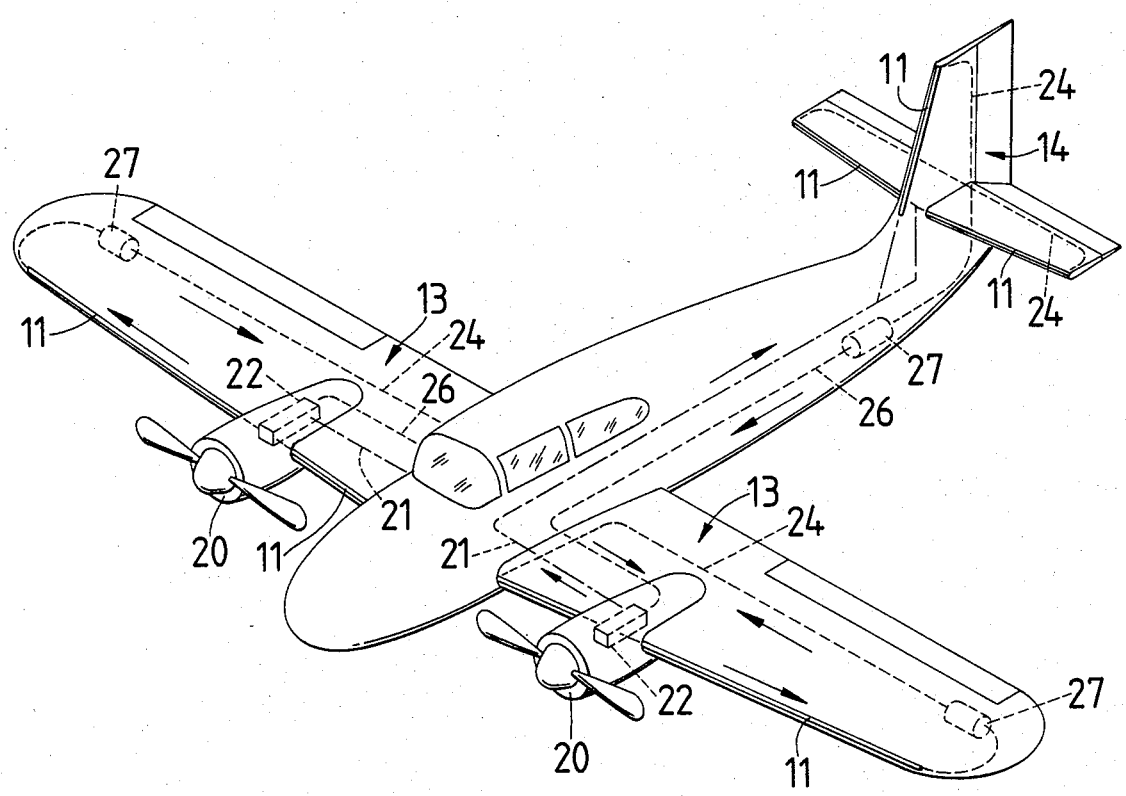

Referring now to the drawings for a better understanding of my invention, I show in FIGS. 1 and 2 my improved apparatus adapted for de-icing the leading edges of airfoil sections of a single engine aircraft. While I show my improved apparatus as being associated with aircraft having one and two engines, it will be understood that my apparatus is adapted for use on aircraft having any number of engines. My improved apparatus comprises a closed circuit conduit indicated generally at 10 which includes a plurality of heat conductive conduit sections 11 that extend along and are secured to the outer surfaces of the leading edges 12 of the wings 13 and the tail section 14 of the aircraft. Each heat conductive conduit section 11 is shown as being generally flat as viewed in cross section with the contour of its rear side corresponding to that of the leading edge 12 of its airfoil section. Insulation material, such as a strip of insulation indicated at 16, is interposed between the rear side 17 of each heat conductive conduit section 11 and the leading edge 12 of the airfoil section adjacent thereto. The heat conductive section 11 and the insulation 16 is secured in place by suitable means, such as adhesive. The insulation 16 prevents heat from being conducted from the rear side 17 of each heat conductive conduit section 11 to the leading edge of the airfoil section adjacent thereto. The front or leading side of each heat conductive conduit section 11 defines an exposed, heat emitting surface 18 as shown in FIG. 3.

One end 19 of each heat conductive conduit section 11 is shown as being connected to a supply conduit 21 which in turn is connected to the discharge side of an oil circulating unit indicated diagrammatically at 22 which is preferably associated with the power unit for the aircraft, indicated generally at 20. The other end 23 of each heat conductive conduit section 11 is connected to a return conduit 24 indicated by dashed lines in FIGS. 2 and 4. Each return conduit 24 is connected to a common return conduit 26 which communicates with the suction or inlet side of the oil circulating unit 22.

As shown in FIG. 2, a pump 27 is provided in the return conduit 24 adjacent the tip of each wing 13 and in the common return conduit 26 adjacent the tail section 14 of the aircraft. While the power unit 20 for the aircraft is operating, oil is circulated under pressure therethrough by the oil circulating unit 22 with the operation of the power unit heating the oil to elevated temperatures in the usual manner. The heated oil is discharged from the oil circulating unit at a predetermined rate under pressure to the receiving end 19 of each heat conductive conduit section 11. The flow of heated oil through each heat conductive section 11 causes heat to be emitted along the entire length of each heat emitting surface 18 to thus de-ice the leading edges of the airfoil sections. At the same time heat is emitted from the heat emitting surface 18 of each heat conductive section 11, cooled oil is returned through the conduit 26 to the suction side of the oil circulating unit 22. The pumps 27 serve as auxiliary means to aid in maintaining the flow rate of heated oil through the closed circuit conduit 10.

From the foregoing description, the operation of my improved apparatus and method for de-icing the leading edges of airfoil sections of aircraft will be readily understood. With the closed circuit heated oil circulating system installed on conventional aircraft, such as propeller driven or jet aircraft, heated oil from the discharge side of the oil circulating unit 22 associated with the power unit 20 for the aircraft is circulated under pressure through each heat conductive section 11. This flow of heated oil through each heat conductive section 11 causes heat to be emitted from the heat emitting surfaces 18. Ice accumulated on the leading sides of the heat conductive sections 11 is caused to be dislodged by the heat emitted from the surfaces 18 to thus de-ice the leading edges of the airfoil sections. The cooled oil discharged from each heat conductive section 11 is then returned through the return conduits 24 and 26 to the suction side of the oil circulating unit.

It will be apparent that conventional electrically operated control means and/or valves may be associated with the closed circuit conduit to turn the de-icer system on and off and to either manually or automatically regulate the flow of hot oil through the conduit only when it is needed and to prevent loss of the oil in the oil circulating unit in the event a leak should occur in the closed circuit conduit.

From the foregoing, it will be seen that I have devised an improved method and apparatus for de-icing the leading edges of airfoil sections of aircraft. By providing a de-icer which includes a closed circuit conduit that communicates with means for circulating a heated liquid under pressure, such as the oil circulating unit of the power unit propelling the aircraft, I provide a de-icer which emits heat along the entire length of the leading edges of the airfoil sections of the aircraft.

Also, by providing a de-icer which is formed from a light-weight closed circuit conduit, I provide a de-icer which does not add excessive weight to the aircraft and will not disturb the equilibrium or flying characteristics of the aircraft while in flight.

While I have shown my invention in two forms, it will be obvious to those skilled in the art that it is not so limited, but is susceptible of various other changes and modifications without departing from the spirit thereof.

What I claim is:

1. Apparatus for de-icing the leading edge of an airfoil section of an aircraft propelled by at least one power unit having an oil circulating system associated therewith with the oil circulated by said system being heated to an elevated temperature by the operation of said power unit comprising:
   (a) a closed circuit conduit system having a heat conductive section which extends along the leading edge of said airfoil section and is generally flat as viewed in cross section with the contour of the rear side thereof corresponding generally to that of said leading edge of said airfoil section,
   (b) means communicating one end of said heat conductive section with the discharge side of said oil circulating system so that heated oil is circulated through said heat conductive section,
   (c) means communicating the other end of said heat conductive section with the suction side of said oil circulating system,
   (d) auxiliary pumping means in said closed circuit conduit system adjacent said other end of said heat conductive section to aid in circulating said heated oil through said closed circuit conduit system, and
   (e) means securing the rear side of said heat conductive section to and insulating it from said leading edge of said airfoil section with the leading side of said heat conductive section defining an exposed heated surface to reduce the formation of ice on said leading edge of said airfoil section and to cool said oil returned to said suction side of said oil circulating system.

* * * * *